2,988,569
PROCESS FOR IMPROVING THE STABILITY AND TASTE OF TETRACYCLINE ANTIBIOTICS

James D. Duerr, Bayside, and Basil A. Pappas, Brooklyn, N.Y., assignors to Chas. Pfizer & Co., Inc., New York, N.Y., a corporation of Delaware
No Drawing. Filed Nov. 28, 1958, Ser. No. 776,695
5 Claims. (Cl. 260—559)

This invention relates to the purification of tetracycline antibiotics and more particularly to the production of tasteless, amphoteric tetracycline antibiotics of improved visual appearance and stability, as well as low color value.

Stable, tasteless tetracycline antibiotics are highly desirable for various pharmaceutical formulations, such as intramuscular suspensions, oral preparations, such as suspensions in various syrups, pediatric drops, etc. The usual amphoteric tetracycline antibiotic production material, obtained by either fermentation or chemical processes, generally contains various bitter-testing impurities and colored materials which detract appreciably from the use thereof in pharmaceutical preparations. Further, such material is often found unstable, resulting in variation of the potency of such preparations and appreciably detracting from the shelf-life of same.

British Patent 717,281 describes a method of extracting and, at the same time, purifying chlortetracycline by precipitation of the antibiotic from aqueous solution with selected organic sulfuric acid derivatives such as sodium-laurylsulfate and the like, and recovering the organic sulfuric acid derivative salt of the antibiotic by separation of the precipitate formed or extraction of the mixture with water-immiscible solvent.

It has now been surprisingly found that tetracycline antibiotics may be readily freed of various bitter-tasting impurities and colored materials to yield a tasteless, amphoteric antibiotic of improved visual appearance and stability as well as low color values by a process as hereinafter described. The tetracycline antibiotics, as obtained by the process of the present invention are in the form of pale yellow crystals which are relatively tasteless and of improved stability and as such, are particularly suited for the preparation of pharmaceutical preparations.

As employed herein, the term "tetracycline antibiotic" includes the broad spectrum antibiotics, tetracycline, oxytetracycline and chlortetracycline, the efficacy of which has been documented in numerous scientific articles found in medical literature.

It has now been observed that by treating an aqueous solution of a tetracycline antibiotic with an anionic organic compound, as more particularly hereinafter described, it is possible to obtain a substantially tasteless and stable form of the neutral antibotic by adjusting the pH of the filtered reaction mixture to a value sufficient to allow the precipitation of the amphoteric antibiotic. The amphoteric antibiotic may then be readily removed from the mixture, as by filtration, to obtain the improved product.

The process of the present invention is preferably carried out by adjusting the pH of an aqueous solution of impure tetracycline antibiotic to a value of from about 0.5 to about 2. This adjustment may be brought about by the addition of commonly used mineral acids, such as hydrochloric, sulfuric and the like. Such treatment provides a homogeneous reaction mixture by solubilizing the antibiotic. After pH adjustment, the anionic organic compound is then added to the aqueous solution which is then preferably stirred, and the mixture freed of the precipiate thus formed by any of the conventional methods, for example, by filtration, with filter aids if desired. The filtered mixture, that is, the filtrate, is then treated with alkali so that the pH is adjusted to a pH of from about 3 to about 5. Precipitation of the purified antibiotic usually occurs at about pH 3 and is more complete at higher pH values. pH values above 5 should preferably be avoided since the product obtained may be less desirable. The amphoteric tetcracycline antibiotic thus obtained is a light-colored essentially tasteless stable product.

The anionic organic compounds employed in the present process with high efficiency are higher alkanoic acids and sulfuric acid monoesters of higher alkanols and of lower alkanolamides of higher alkanoic acids, preferably in the form of an alkali metal salt, that is, the sodium, potassium or lithium salt. As employed herein higher alkanols and higher alkanoic acids refer to alkanols and alkanoic acids containing at least 10 carbon atoms. Lower alkanolamides of higher alkanoic acids are prepared by reaction of a lower alkanolamine with a higher alkanoic acid by known procedure. Lower alkanolamines are alkanolamines containing 2 to 4 carbon atoms, for example, ethanolamine, propanolamine, or butanolamine.

Exemplary of the anionic reagents employed in the present process are the following salts: sodium lauryl sulfate, potassium decanoate, sodium stearate, sodium palmitate, lithium tetracosanoate, sodium dodecanoate, lithium decylsulfate, sodium tetracosanylsulfate, sodium eicosanylsulfate and sodium salts of sulfuric acid monoesters of N-2-ethanolstearamide, N-2-butanolpalmitamide, N-2-propanoldecanoamide, N-2-ethanoleicosanoamide, N-2-ethanoltetracosanoamide and the like. Other anionic organic salts are operable but are not found as efficient as the above described.

Optimum results are obtained when employing the present anionic salts in an amount equal to at least about 4% and preferably up to about 7% by weight of the impure tetracycline antibiotic. The use of a lower percentage of salt results in some purification of course. The use of larger percentages, greater than 7%, while operable, is not preferred since appreciable loss of antibiotic may occur due to the formation of insoluble salts which may materially reduce the yield of the final product.

The tetracycline antibiotics employed in the process of the present invention are obtained by fermentation procedures, as well as by chemical process. For example, tetracycline may be produced by the reductive dehalogenation of chlortetracycline, for example, as described in U.S. Patent 2,699,054 or alternatively by the fermentation process as described in the U.S. Patent 2,482,055 and British Patent 775,115. Oxytetracycline is prepared according to the procedure of U.S. Patent 2,516,080 and chlortetracycline by the procedure of U.S. Patent 2,482,055. Production material obtained by the above procedures may have a purity of about 95% and higher and assay as little as 800 units up to above 950 units of antibiotic activity per milligram and even higher. By "impure tetracycline antibiotic" as employed herein is meant production material as described above. The present process is found effective with such production material and even with material of high bioassay, say up to 1000 units of activity per milligram. In this latter material the presence of minor amounts of impurities does not noticeably alter the antibiotic activity but may contribute to bitter taste, lack of stability and/or high color values of the antibiotic. The bioassays mentioned above are based on the amphoteric tetracycline antibiotic.

As mentioned above, the tetracycline antibiotic is dissolved in an aqueous solution at a pH below 2. This may be accomplished employing the antibiotic in its amphoteric form, commonly referred to as the free base, or in the form of salts, for example, with acids or bases, Sufficient acid is added to the resultant mixture to adjust the pH to the desired value.

After the removal of the precipitate formed during the course of the instant process, the pH is adjusted to a value sufficient to allow the precipitation of the tasteless, stable, amphoteric tetracycline antibiotic. This adjustment of pH may be effected by the use of basic substances commonly employed for this purpose, such as alkali metal hydroxides, carbonates or bicarbonates, ammonium hydroxide, alkali metal salts of organic acids, such as citric acid, acetic acid, and the like. Although the basic substance may be added in solid form, it is preferred to employ aqueous solutions which allow a more accurate adjustment of pH. If desired, a water-miscible organic solvent may be added to the reaction mixture to control the rate of precipitation of the amphoteric antibiotic. It is often convenient to add the organic solvent togeher with the aqueous solution of base. Such solvents include for example, lower ketones, such as acetone and ethylmethyl ketone, and lower alkanols, such as methanol, ethanol and propanol.

The outstanding results obtained by the process of the present invention are not clearly understood. As mentioned previously, British Patent 717,281 describes a process of separating chlortetracycline from aqueous solution by precipitation of the antibiotic with anionic organic sulfuric acid derivatives. The anionic compounds are employed in molecular proportions to recover substantially all of the antibiotic activity by either extraction or filtration of the resultant precipitate. The present process, however, employs the anionic compounds, as herein described, in only minor proportion to the antibiotic and, apparently, results in precipitation of those impurities which are responsible for bitter taste, lack of stability and/or high color values of the impure antibiotic. The present process has many advantages over that of the above described British patent. For example, to obtain amphoteric chlortetracycline by the latter procedure, the resultant precipitate must be metathesized with mineral acid, for example, hydrochloric acid and the resultant acid salt neutralized. The present process, however, yields the amphoteric antibiotic directly, thus avoiding the added steps of metathesis and neutralization which are economically less desirable. Such treatment steps may also result in a less desirable form of the amphoteric antibiotic.

The following examples are given by way of illustration and are not to be construed as limitations of this invention, many variations of which are possible without departing from the scope and spirit thereof.

*Example I*

To a solution of 50 g. of oxytetracycline hydrochloride in 2 liters of water is slowly added with stirring 2.9 g. of sodium lauryl sulfate. The mixture is then stirred and filtered, and the precipitate washed with 100 cc. of .01 N HCl. Sodium citrate is added to the combined filtrate and wash in a 2 liter beaker until the pH is 4.0. On standing amphoteric oxytetracycline crystallizes and is subsequently filtered. The precipitate is washed with 200 ml. portions of water by slurrying and then filtered and dried. The crystalline amphoteric oxytetracycline obtained in 90% yield appears an off-white color and is found particularly stable when employed in suspensions for either oral or intramuscular administration.

*Example II*

To a solution of 100 g. of oxytetracycline in 700 ml. of water is added sufficient concentrated hydrochloric acid to adjust the pH to 1.0. 5.8 grams of sodium lauryl sulfate is then added followed by thorough stirring. The mixture is filtered and the filtrate transferred to a 2 liter beaker. 50 grams of sodium citrate is dissolved in 125 ml. of water to which has been added 125 ml. of acetone and enough water to form a clear solution. This solution is then added to the filtrate.

The mixture is allowed to stand and the resultant crystals are removed using a basket centrifuge. The precipitate is washed with water and dried under vacuum. The product obtained in 88% yield is light yellow in color having the crystal shape of 60 to 100 micron rods and a bioassay of 927 units of tetracycline per mg.

*Example III*

The procedure of Example I is repeated employing tetracycline in place of oxytetracycline and 2 grams of sodium lauryl sulfate with essentially the same results.

Amphoteric tetracycline thus obtained is pale yellow and is found particularly suitable fo the preparation of suspensions for oral or intramuscular administration of the antibiotic.

*Example IV*

The procedure of Example I is repeated with chlortetracycline and 3.5 grams of sodium lauryl sulfate with similar results.

Amphoteric chlortetracycline as obtained is pale yellow in color and is found particularly suitable for the preparation of suspensions for oral or intramuscular administration of the antibiotic.

*Example V*

The procedure of the above examples are repeated employing the following salts in place of sodium lauryl sulfate: potassium decanoate, sodium stearate, sodium palmitate, lithium tetracosanoate, sodium dedecanoate, lithium decylsulfate, sodium tetracosanylsulfate, sodium eicosanylsulfate and sodium salts of sulfuric acid monoesters of N-2-ethanolstearamide, N-2-butanolpalmitamide, N-2-propanoldecanoamide, N-2-ethanoleicosanoamide, N-2-ethanoltetracosanoamide and the like.

Comparable results are obtained.

What is claimed is:

1. A process for improving the stability and taste of a tetracycline antibiotic selected from the group consisting of tetracycline, oxytetracycline and chlortetracycline which comprises contacting an aqueous solution of said tetracycline antibiotic at a pH of from about 0.5 to about 2 with a salt selected from the group consisting of sodium, potassium and lithium salts of an anionic substance selected from the group consisting of higher alkanoic acid of from 10 to 24 carbon atoms and sulfuric acid monoesters of an alkanol of from 10 to 24 carbon atoms and N-alkanolamide of said alkanoic acid wherein the alkanol group contains 2 to 4 carbon atoms, the amount of said alkali metal salt being from about 4% to about 7% by weight of said tetracycline antibiotic, separating resulting precipitate, adjusting the pH of solution so produced to a value of from about 3 to about 5 and recovering said antibiotic.

2. A process as in claim 1 wherein the tetracycline antibiotic is oxytetracycline.

3. A process as in claim 1 wherein the tetracycline antibiotic is tetracycline.

4. A process as in claim 1 wherein the anionic substance is monolaurylsulfate.

5. A process as in claim 1 wherein the anionic substance is palmitic acid.

References Cited in the file of this patent

UNITED STATES PATENTS

| 2,886,595 | Heinemann et al. | Sept. 30, 1958 |

FOREIGN PATENTS

| 497,344 | Canada | Nov. 3, 1953 |
| 523,135 | Canada | Mar. 27, 1956 |
| 157,067 | Australia | Sept. 11, 1952 |
| 717,281 | Great Britain | Oct. 27, 1954 |
| 1,000,810 | Germany | Jan. 17, 1957 |

OTHER REFERENCES

Van Dyck et al.; Antibiotics and Chemotherapy, vol. 2, No. 4 (1952), pages 184; 192-6.